Patented Sept. 7, 1926.

1,599,212

UNITED STATES PATENT OFFICE.

KENNETH F. COOPER, OF GREAT NECK, NEW YORK, ASSIGNOR TO AMERICAN CYANAMID COMPANY, OF NEW YORK, N. Y., A CORPORATION OF MAINE.

CYANIDE PRODUCT AND PROCESS OF PRODUCING THE SAME.

No Drawing.   Application filed May 29, 1923.   Serial No. 642,339.

This invention relates to a cyanide product and process of producing the same, and has for its object to provide a product and a procedure which is more desirable in practice than those heretofore proposed.

With these and other objects in view the invention consists in the novel article of manufacture constituting the product and in the novel steps and combinations of steps constituting the process all as will be more fully hereinafter disclosed and particularly pointed out in the claims.

In order that the invention may be the more clearly understood it is said:—It is well known that in the production of commercial cyanides by such processes as yield their final products from aqueous solutions through evaporative or drying procedures to effect their ultimate recoveries, it has been found impossible to produce a commercially pure white product within the limits of costs. That is, even though the original solution contains, for example, practically only sodium cyanide, by the time it is evaporated and dried, it will be found that a decomposition has set in, and the best product produced by this procedure will only run from say 90% to 94% sodium cyanide, with an average content of about 92% sodium cyanide. The bulk of the remaining constituents will generally be found to consist of sodium carbonate and sodium hydroxide with the former predominating, together with various unknown organic decomposition products. Should cyanides derived in this manner from aqueous solutions be fused it is further well known that experience shows that a further decomposition sets in, and the resulting product, instead of being white takes on a more or less gray to a black color due to such further decomposition. It is therefore the common practice to avoid fusing these products in ordinary cases and to briquette the same, which of course is not so desirable from a commercial standpoint as would be a fusing procedure.

In carrying out this process on the other hand, the foregoing objections are obviated by proceeding as follows: To a sodium cyanide for example that is produced from aqueous solutions, I add first a small quantity of essentially anhydrous sodium ferrocyanide $Na_4Fe(CN)_6$, and then fuse the mixture to produce a pure white marble like cyanide of a grade several per cent higher than the original crystallized cyanide that was placed in the fusion pot.

As an example of this procedure, one may take a low grade cyanide crystal or dryer product analyzing say 58% sodium cyanide and add it to say 5% of its weight of essentially anhydrous sodium ferrocyanide $Na_4Fe(CN)_6$, and after mixing these compounds charge the mixture into a fusion pot and melt the mass. The iron that is produced during the reaction floats on top of the molten bath and is agglomerated into a spongy mass, when it is skimmed off. The molten iron free product is now conveniently cast into molds when upon cooling it will be found to consist of a pure white marble like product analyzing say 60% sodium cyanide. The amount of anhydrous sodium ferrocyanide which is used in each instance will be proportioned to the impurities present in the original cyanide to be raised in grade. I may safely add up to say two and a half times the weight of these impurities in the form of essentially anhydrous sodium ferrocyanide in carrying out this invention. On the other hand, it is not necessary to use so much anhydrous sodium ferrocyanide if one merely desires to still further improve a fairly high grade of cyanide of sodium. Especially is this true when using a grade containing say 80% or 90% of crude cyanide. In such case an addition of anhydrous sodium ferrocyanide of say 5% of the weight of the original cyanide is sufficient to clarify the mass and produce a high grade product.

From the foregoing it will be seen that this invention not only provides a procedure for raising the grade of a crude cyanide after the same has been recovered from an aqueous solution, but it also provides a fused product consisting of a pure white marble like mass of cyanide of a higher grade than was the original mass.

What is claimed is:

1. The process of improving the quality of a crude cyanide containing decomposition products which consists in adding a ferrocyanide to said crude cyanide; fusing the mixture thus produced; removing any iron that may separate out during the fusion; and cooling and recovering the iron free product thus produced.

2. The process of improving the grade of a crude cyanide of the alkali metal class derived from an aqueous solution and containing alkali metal hydroxide or carbonate or both which consists in adding to said cyanide a ferrocyanide; fusing the mixture thus produced; removing any iron set free during the fusion process; and cooling and recovering the resulting iron free fused product.

3. The process of improving the grade of an impure alkali metal cyanide derived from an aqueous solution and containing alkali metal hydroxide or carbonate or both which consists in adding to said cyanide an alkali metal ferrocyanide; fusing the mixture thus produced; removing any iron set free by the fusion of said mixture; and recovering the resulting improved fused iron free alkali metal cyanide.

4. The process of improving the grade of an impure sodium cyanide derived from an aqueous solution and containing sodium hydroxide or carbonate or both which consists in adding to said cyanide a quantity of sodium ferrocyanide; fusing the mixture thus produced; separating out any iron set free during the process of fusion; and casting in molds the resulting iron free and improved sodium cyanide.

In testimony whereof I affix my signature.

KENNETH F. COOPER.